(12) United States Patent
Gracki

(10) Patent No.: US 11,339,046 B1
(45) Date of Patent: May 24, 2022

(54) AUTO-WATER SHUT-OFF FOR AN EXTERNAL DOOR WATER DISPENSER

(71) Applicant: Electrolux Home Products, Inc., Charlotte, NC (US)

(72) Inventor: John Gracki, Anderson, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 0 days.

(21) Appl. No.: 17/176,564

(22) Filed: Feb. 16, 2021

(51) Int. Cl.
*B67D 1/08* (2006.01)
*F25D 23/02* (2006.01)
*F25D 23/12* (2006.01)
*B67D 1/12* (2006.01)

(52) U.S. Cl.
CPC ......... *B67D 1/0878* (2013.01); *B67D 1/0888* (2013.01); *B67D 1/1277* (2013.01); *F25D 23/028* (2013.01); *F25D 23/126* (2013.01)

(58) Field of Classification Search
CPC .. B67D 1/1277; B67D 1/0878; B67D 1/0888; F25D 23/028; F25D 23/126
USPC .......................................................... 141/95
See application file for complete search history.

(56) References Cited

U.S. PATENT DOCUMENTS

| | | | | |
|---|---|---|---|---|
| 7,661,448 B2 * | 2/2010 | Kim | ...................... | B67D 1/0857 141/94 |
| 7,690,403 B2 * | 4/2010 | You | ...................... | B67D 1/0871 141/83 |
| 7,743,801 B2 * | 6/2010 | Janardhanam | ........ | F25D 23/126 141/351 |
| 8,109,301 B1 * | 2/2012 | Denise | .................. | F25D 23/126 141/360 |
| 8,167,004 B2 * | 5/2012 | Lee | ...................... | G01F 23/2962 141/198 |
| 8,935,935 B2 * | 1/2015 | Waugh | ...................... | F17D 3/00 62/132 |
| 9,004,115 B2 * | 4/2015 | Krause | ................. | B67D 1/1236 141/2 |
| 9,557,097 B2 * | 1/2017 | McMahan | ............ | B67D 1/1238 |
| 9,739,517 B2 * | 8/2017 | Root | ..................... | B67D 1/1238 |
| 10,866,599 B2 * | 12/2020 | Zhang | ...................... | G05D 9/00 |
| 2013/0228250 A1 * | 9/2013 | Agam | .................... | G01F 23/296 141/83 |
| 2017/0010034 A1 * | 1/2017 | Doering | ................ | F25D 23/126 |
| 2021/0009402 A1 * | 1/2021 | Moskowitz | ........... | B67D 1/0888 |
| 2021/0053812 A1 * | 2/2021 | Chernov | ................. | G01S 17/42 |

* cited by examiner

*Primary Examiner* — Timothy L Maust
(74) *Attorney, Agent, or Firm* — Pearne & Gordon LLP

(57) ABSTRACT

A refrigerator including a refrigerated compartment and a door to open and close at least a portion of the refrigerated compartment. A dispenser unit is positioned on the door that is configured to dispense content into a receptacle. The dispenser unit includes a receptacle support, a dispensing system, a sensor system with at least a first sensor and a second sensor. A control unit electrically coupled to the dispensing system and sensor system. The dispensing system is configured to operate the first sensor to determine the receptacle height and the second sensor to determine the liquid height within the receptacle. The control unit determines when to stop filling the receptacle based on the two measurements. A method for detecting when to shut off the dispensing unit when dispensing liquid into a receptacle.

17 Claims, 7 Drawing Sheets

AUTO-WATER SHUT-OFF FOR AN EXTERNAL DOOR WATER DISPENSER

TECHNICAL FIELD

The present application relates generally to refrigeration appliances, and in particular to dispensing units associated with refrigeration appliances.

BACKGROUND

Modern refrigeration appliances, such as household refrigerators for example, often include as one of their features a dispenser for dispensing content, the content typically being water and/or ice. Frequently, the dispenser is located within a recess in the exterior surface of a door of the appliance. The refrigeration appliance can take any one of a number of forms. For example, the refrigeration appliance can have freezer and fresh food compartments that are arranged side-by-side, the freezer compartment can be located above the fresh food compartment, or the freezer can be located below the fresh food compartment. In any case, separate doors can be provided for the freezer and fresh food compartments and a dispenser can be located within the recess in the exterior of at least one of the doors.

SUMMARY

The following presents a simplified summary of the disclosure in order to provide a basic understanding of some example aspects of the disclosure. This summary is not an extensive overview of the disclosure. Moreover, this summary is not intended to identify critical elements of the disclosure nor delineate the scope of the disclosure. The sole purpose of the summary is to present some concepts of the disclosure in simplified form as a prelude to the more detailed description that is presented later.

In accordance with one aspect of the present disclosure, a refrigerator comprises a cabinet defining a food-storage compartment, a door pivotally mounted to the cabinet to provide selective access to the food-storage compartment, a liquid dispensing unit, and a control unit. The liquid dispenser unit is accessible at an exterior surface of the door. The liquid dispenser unit comprises a receptacle support, a dispensing system comprising an electrically-operated valve configured to dispense a liquid into a receptacle on the receptacle support, and a sensor system comprising at least a first capacitive sensor and a second capacitive sensor. The control unit is electrically coupled to the dispensing system and electrically coupled to the sensor system. The control unit is configured to operate the first capacitive sensor to determine an uppermost receptacle height relative to a reference, and is configured to operate the second capacitive sensor to determine an instantaneous liquid height, relative to the reference, of a liquid contained within the receptacle, and is configured to operate the electrically-operated valve based on the receptacle height and the instantaneous liquid height.

In accordance with another aspect of the present disclosure, it is possible to provide a control unit that is configured to the electrically-operated valve such that liquid is dispensed into the receptacle until the instantaneous liquid height is a specified difference from the receptacle height.

In accordance with another aspect of the present disclosure, it is possible to further provide a user interface configured to allow a user to select the specified difference as a desired liquid height as a percentage of the receptacle height.

In accordance with another aspect of the present disclosure, the reference is a location of the first sensor or the second sensor.

In accordance with another aspect of the present disclosure, it is possible the control unit is configured to operate the first capacitive sensor to determine an uppermost part of the receptacle as the receptacle height.

In accordance with another aspect of the present disclosure, the control unit is configured to operate the valve such that liquid is dispensed into the receptacle until the liquid height is a specified difference from the receptacle height.

In accordance with of the present disclosure, it is possible the control unit is configured to operate the sensor system to determine a stale liquid contained in the receptacle.

In accordance with of the present disclosure, it is possible to further provide a user interface electrically coupled to the control unit and the user interface is configured to present the instantaneous liquid height relative to the receptacle height of a liquid contained within the receptacle.

In accordance with of the present disclosure, it is possible to further provide a user interface comprising at least one sound producing device and the sound producing device is configured to alert a user when the receptacle is full.

In accordance with another aspect of the present disclosure, a method of dispensing a liquid from a refrigerator, comprising the steps of sensing an uppermost receptacle height of a top of a receptacle relative to a reference; dispensing a liquid into the receptacle; sensing an instantaneous liquid height of a liquid contained within the receptacle relative to the reference; comparing the instantaneous height of the liquid within the receptacle with a height of the receptacle to determine if the liquid height is a specified difference from the receptacle height; repeating the steps of sensing the instantaneous height of the liquid within the receptacle and comparing the instantaneous height of the liquid within the receptacle with the height of the receptacle; and terminating the dispensing when the liquid height is a specified difference from the height of the receptacle.

In accordance with another aspect of the present disclosure, the method wherein the step of sensing of the uppermost height of the receptacle is performed by a first capacitive sensor, and the step of sensing of the instantaneous height of the liquid within the receptacle is performed by a second capacitive sensor.

In accordance with another aspect of the present disclosure, the method wherein the reference is a location of a first sensor or second sensor.

In accordance with another aspect of the present disclosure, the method further comprising the step of illuminating at least one visual indicator to indicate a stale liquid found in the receptacle.

In accordance with another aspect of the present disclosure, the method further comprising the step of producing an audible tone when terminating the dispensing of liquid.

In accordance with another aspect of the present disclosure, the method further comprising the step of displaying the instantaneous height of the liquid within the receptacle relative to the height of the receptacle.

In accordance with another aspect of the present disclosure, the method further comprising the step determining the specified difference based on a selected fill percentage.

In accordance with another aspect of the present disclosure, the method wherein the reference is a location of a receptacle support on which the receptacle is located during the dispensing.

It is to be understood that both the foregoing general description and the following detailed description present example and explanatory embodiments of the disclosure, and are intended to provide an overview or framework for understanding the nature and character of the disclosure as it is claimed. The accompanying drawings are included to provide a further understanding of the disclosure and are incorporated into and constitute a part of this specification. The drawings illustrate various example embodiments of the disclosure, and together with the description, serve to explain the principles and operations of the disclosure.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

DETAILED DESCRIPTION OF EXAMPLE EMBODIMENTS

Figure 1:
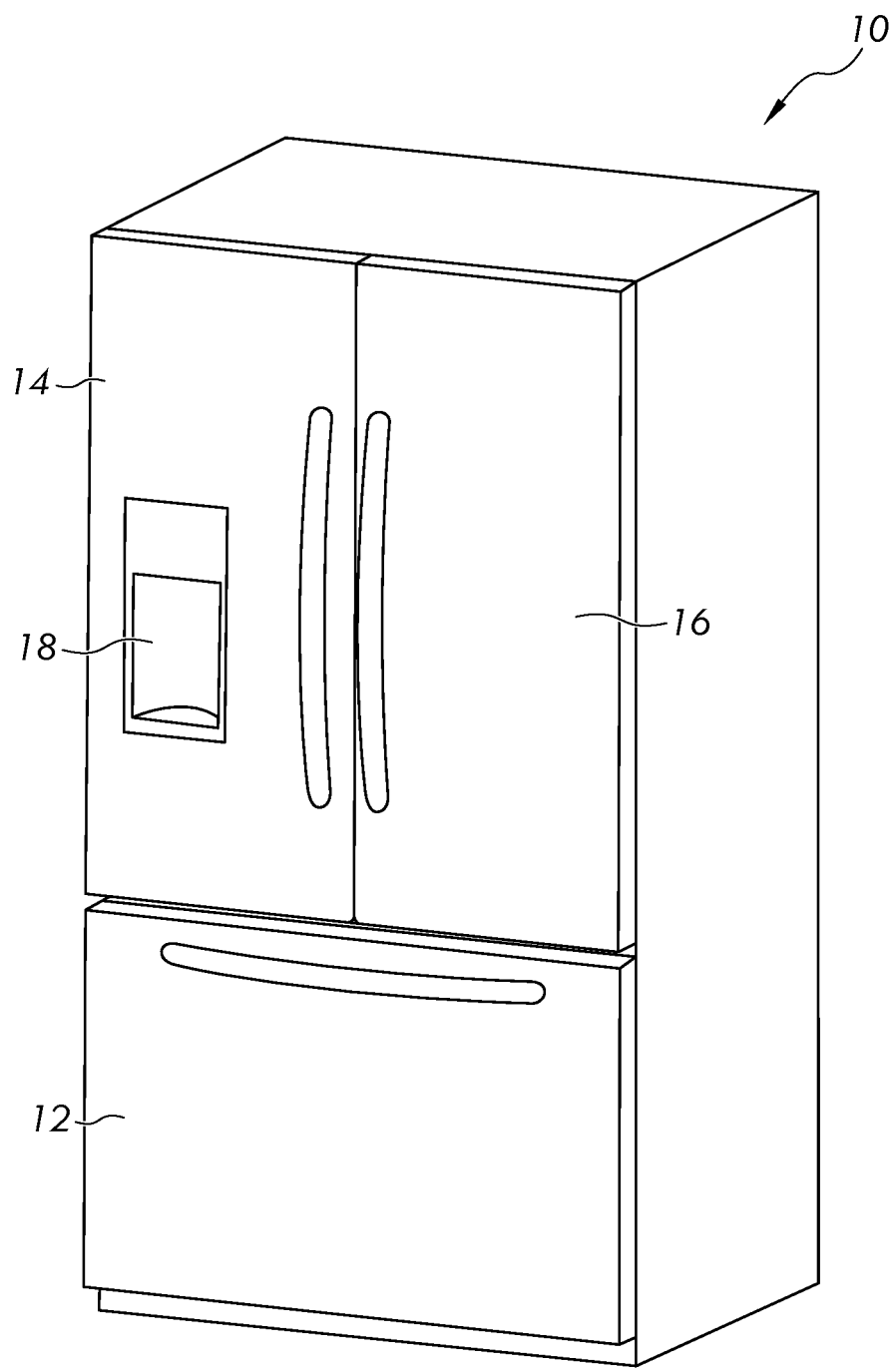
FIG. 1 is a schematic front elevation view of a refrigeration appliance illustrating one example dispensing unit.

Example embodiments that incorporate one or more aspects of the present application are described and illustrated in the drawings. These illustrated examples are not intended to be a limitation on the present application. For example, one or more aspects of the present application can be utilized in other embodiments and even other types of devices. Moreover, certain terminology is used herein for convenience only and is not to be taken as a limitation on the present application. Still further, in the drawings, the same reference numerals are employed for designating the same elements.

Figure 2:
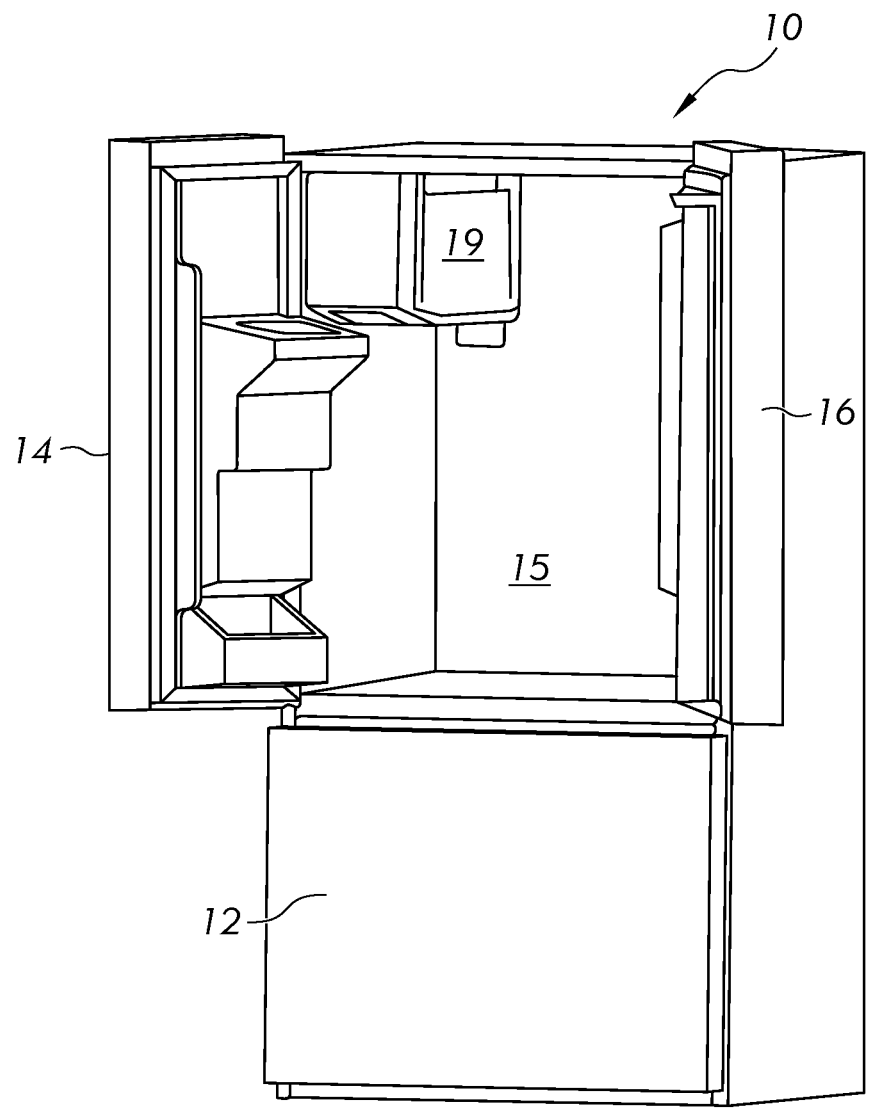
FIG. 2 is a schematic front elevation view of an open refrigeration appliance.

Referring to FIGS. 1 and 2, a refrigeration appliance is illustrated in the form of a domestic refrigerator, indicated generally at 10. Conventional refrigeration appliances typically have both a fresh food compartment 15 and a freezer compartment or section. The fresh food compartment 15 is where food items such as fruits, vegetables, and beverages are stored and the freezer compartment is where food items that are to be kept in a frozen condition are stored. The refrigerators are provided with a refrigeration system that maintains the fresh food compartment at temperatures above 0° C. and the freezer compartments at temperatures below 0° C. Although the detailed description of an embodiment in the present disclosure that follows concerns a domestic refrigerator 10, the disclosure can also apply to refrigeration appliances other than a domestic refrigerator 10. Further, an embodiment is described in detail below, and shown in the figures as a "bottom-mount" configuration of a refrigerator 10, including a cabinet defining a compartment, such as a fresh-food compartment 15, disposed vertically above a freezer compartment. Still, the cabinet can, for example, define the fresh-food compartment laterally beside the freezer compartment (i.e., a "side-by-side" refrigerator) or freezer compartment above the fresh-food compartment (i.e., a "top-mount" refrigerator).

One or more doors 14, 16 shown in FIGS. 1 and 2 are pivotally coupled to a cabinet of the refrigerator 10 to restrict and grant access to the fresh food compartment 15. The door can include a single door 17 that spans the entire lateral distance across the entrance to the freezer food compartment (see FIG. 3), or can be one of a pair of French-type doors 14 and 16 as shown in FIGS. 1 and 2 that collectively span the entire lateral distance of the entrance to the fresh food compartment 15 to enclose the fresh food compartment 15. For the latter configuration, a center mullion coupled to at least one of the doors 14, 16 to establish a surface against which the doors 14, 16 can seal the entrance to the fresh food compartment 15 at a location between opposing side surfaces of the doors 14, 16.

A dispenser 18 for dispensing at least water, and optionally ice pieces, can be provided to one of the doors 16 that restricts access to the fresh food compartment 15 shown in FIGS. 1 and 2. Generally, the dispenser 18 can include a lever, switch, proximity sensor or other device that a user can interact with to cause water from a dispensing unit or ice pieces to be dispensed from an ice bin (not shown) provided to an ice maker 19 disposed within the refrigerator 10 through the door 16. Ice pieces from the ice bin can be delivered to the dispenser via an ice chute or the like that extends at least partially through the door 16 between the dispenser 18 and the ice bin. It is understood that dispenser 18 could also be located at various locations on the refrigerator door or even inside the refrigerator.

Figure 3:
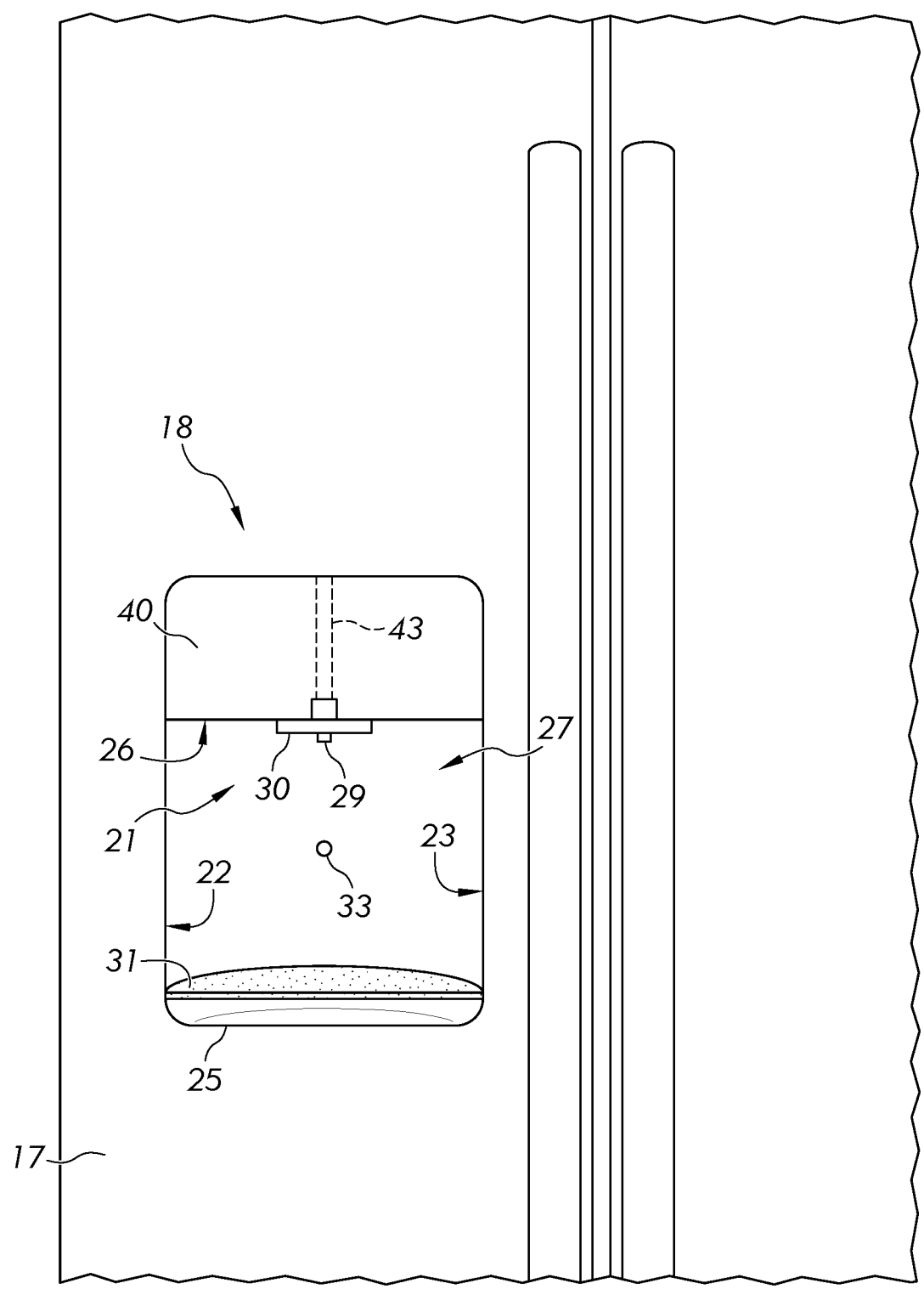
FIG. 3 is a detailed view of the example recess.

Referring to FIG. 3, the dispenser 18 is located in a recess 21 in the door 14. The recess 21 comprises side walls or surfaces 22 and 23 that are opposite one another, a bottom or lower wall or surface 25, an upper or top wall or surface 26 and a back or rear wall or surface 27. A water dispensing outlet 29 for dispensing water and an ice dispensing outlet 30 for dispensing ice are located at the upper surface 26 of the recess 21. The water dispensing outlet 29 could be used to dispense other liquids, for example, hot water or other stored liquids. In the shown embodiment of FIG. 4, the dispenser unit 28 can include a single dispensing outlet for the water and ice arranged so as to substantially coincide with one another at the upper surface 26 of the recess 21. However, in an alternative embodiment (not shown), a single dispensing outlet for water and a single dispensing outlet for ice can be arranged so as to be spaced apart from one another at the upper surface 26 of the recess 21 across the width of the access door 12 and not coincide with each other. The bottom surface 25 of the recess 21 can include a trough and/or drain for draining away excess water from the water dispensing outlet 29 and/or water formed from melting ice from the ice dispensing outlet 30 that comes to rest on the bottom surface 25. A receptacle support 31 is positioned above bottom surface 25. Alternatively, the bottom surface 25 can be used as a receptacle support.

The ice dispensing outlet 30 comprises essentially an opening in the upper surface 26 of the recess 21. The opening is in communication with a source of ice such as, for example, the ice storage bin of an ice making unit (not shown) located in the fresh food or freezer compartment of the refrigerator. The ice can be delivered from the ice storage bin to the ice dispensing outlet 30 by an auger which upon activation rotates so as to drive the ice from the storage bin to the ice dispensing outlet 30. Activation of the auger can be accomplished by a control unit 34, see FIG. 4.

Figure 4:
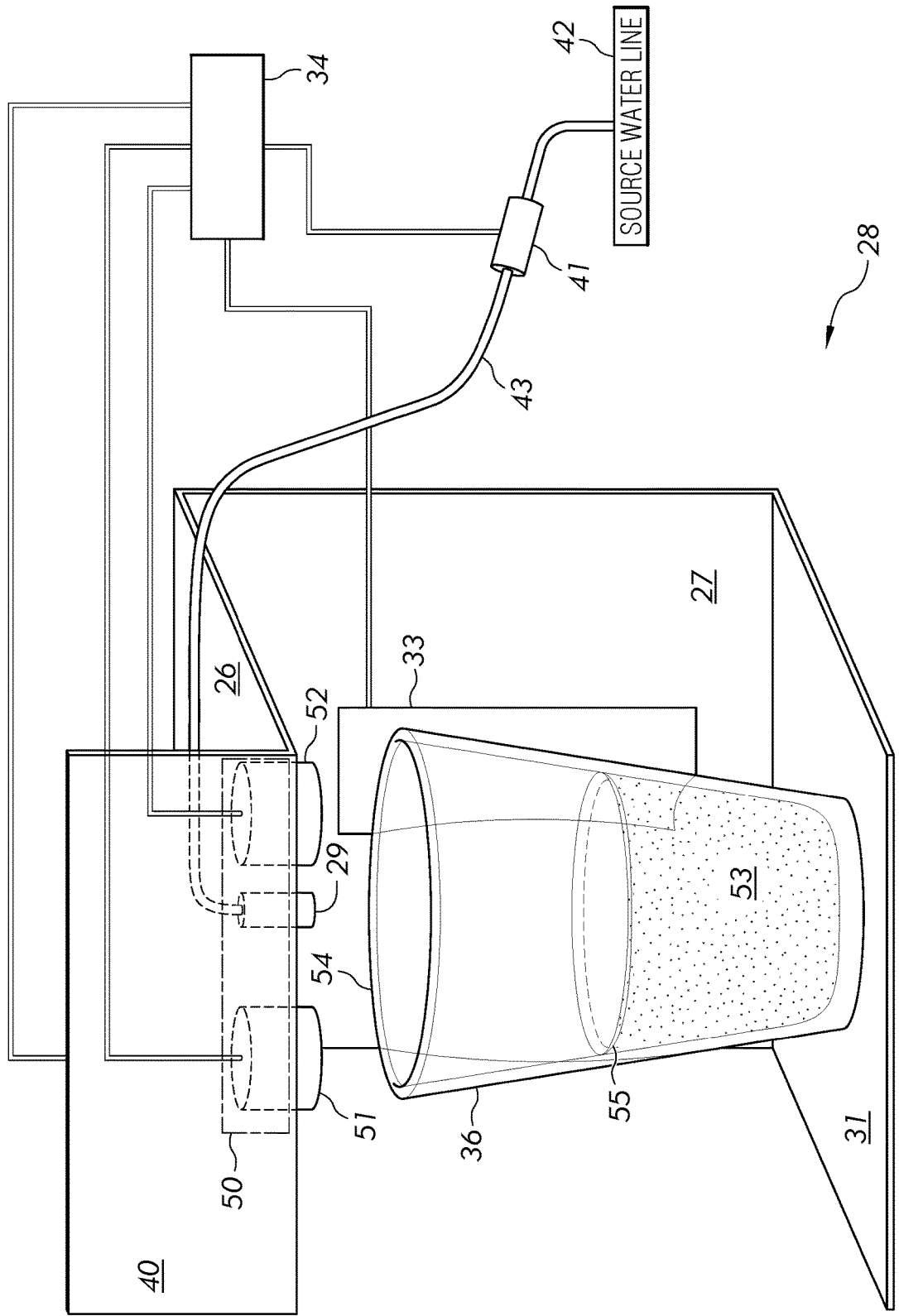
FIG. 4 is a schematic view of the example dispensing unit.

Referring to FIGS. 3 and 4, at least one switch 33 can be electrically coupled to the control unit 34 and be configured to activate dispensing of either or both of water from the water dispensing outlet 29 and ice from the ice dispensing outlet 30. Alternatively, separate switches (not shown) can be provided for each of the water dispensing outlet 29 and the ice dispensing outlet 30. The at least one switch 33 can be a contact-style switch, or can alternatively be non-contact style switch, including other types of vessel detection such as optical, electromagnetic, or ultrasonic, etc. In addition or alternatively, at least these functions can be controlled by the control unit 34, which can be appropriately programmed to perform the described functions. User preferences can be input to the control unit by a user via a user interface 40 that is electrically connected to the control unit 34. The user interface 40 can be a combination of audio, visual, or touch components, for example, speakers, microphones, a touch sensitive display, membrane switches, push-button switches, compute-generated cap active soft keys displayed by a LCD, OLED or other type of display, tactile buttons, multi-position switches, knobs or any other input device that is operable to input a user selection and provide feedback. Thus, when a receptacle 36 such as a glass is inserted within the recess 21 and the switch 33 is activated, water and/or ice can be dispensed on-demand into the receptacle 36.

Operation of the dispenser unit 28 can be controlled by a control unit 34. The control unit 34 can be comprised of various components, including a microprocessor. The microprocessor can be programmed in various ways to accept user inputs from the user interface 40. Additionally, the control unit 34 can received signals from sensors or a sensor system to determine the height of the liquid in the receptacle 36 to determine if more liquid and/or ice needs to be dispensed.

FIG. 4 schematically illustrates components of the liquid dispensing unit 28 found on the refrigerator appliance. The liquid dispensing unit 28 can be accessible at an exterior surface of the door 17. A user can interact with the user interface 40 to control refrigerator parameters, such as the temperature of the freezer compartment, the temperature of fresh food compartment, and other various parameters to control the refrigerator appliance. Additionally, the user interface 40 can allow a user to input a desired liquid height to be dispensed using the liquid dispensing unit 28.

At least one electrically-operated valve 41, such as a solenoid valve can connect a source water line 42 to a water line 43. The source water line 42 can be a water line in the building the refrigerator resides or connected to a water line to providing fresh water. Alternatively, the solenoid valve 41 can connect other lines to the water line 43, for example a hot water line. At least one solenoid valve 41 can be electrically coupled to the control unit 34. The water line 43 can be connected to at least one dispensing outlet 29. The dispensing outlet 29 can be disposed on the top wall surface 26. The control unit 34 is electrically coupled to the user interface 40, and a sensor system 50 comprising at least two sensors: a first sensor 51 and a second sensor 52. The first sensor 51 and second sensor 52 can be capacitive sensor. For example, the first sensor 51 can be a capacitive field effect sensor (capacitive proximity sensor). A capacitive proximity sensor can produce an electrostatic field and can sense disruptions within that electrostatic field. The sensing surface of a capacitive sensor can be formed by two concentrically shaped metal electrodes of an unwound capacitor. When an object nears the sensing surface it enters an electrostatic field of the electrodes and can change the capacitance in an oscillator circuit. As a result, the oscillator begins oscillating. A trigger circuit (in the control unit 34, for example) can read the oscillator's amplitude and use this data to determine changes in the electrostatic field. As an object moves away from the sensor, the oscillator's amplitude decreases. A capacitive proximity sensor can be tuned to focus on a desired property, for example, a particular zone or region or a type of material (metallic or non-metallic).

The first sensor 51 and the second sensor 52 can be disposed at the top wall surface 26. The first sensor 51 can be offset from the center of the receptacle support 31. The center offset of the first sensor 51 allows the first sensor 51 to detect a wall of the receptacle 36 placed on the receptacle support 31. In particular, the first sensor 51 can send a signal to the control unit 34 indicting a distance of an uppermost part of the receptacle 54 from the first sensor. From this signal, the control unit can determine an uppermost receptacle height relative to a reference, such as the location of the one of the sensors. The second sensor 52 can be disposed near the dispensing outlet 29, as to be centered over the desired position of the receptacle 36. Positioning the second sensor 52 near the dispensing outlet 29 allows the second sensor 52 to be in position for sending a signal to the control unit indicating a distance of the liquid from the second sensor 52. From this signal, the control unit can determine an instantaneous height of the liquid 53 contained within the receptacle 36 relative to the reference, such as the one of the sensors. Alternatively, the first and second sensors can determine the relative heights of the receptacle and liquid with respect to some other reference, such as the location the receptacle support 31 or the top wall surface 26. Using information about the height of the uppermost receptacle height relative to the reference and the height of the liquid contained within the receptacle relative to the reference, the control unit can determine an instantaneous liquid height, relative to the uppermost receptacle height, of the liquid contained within the receptacle.

Figure 6:
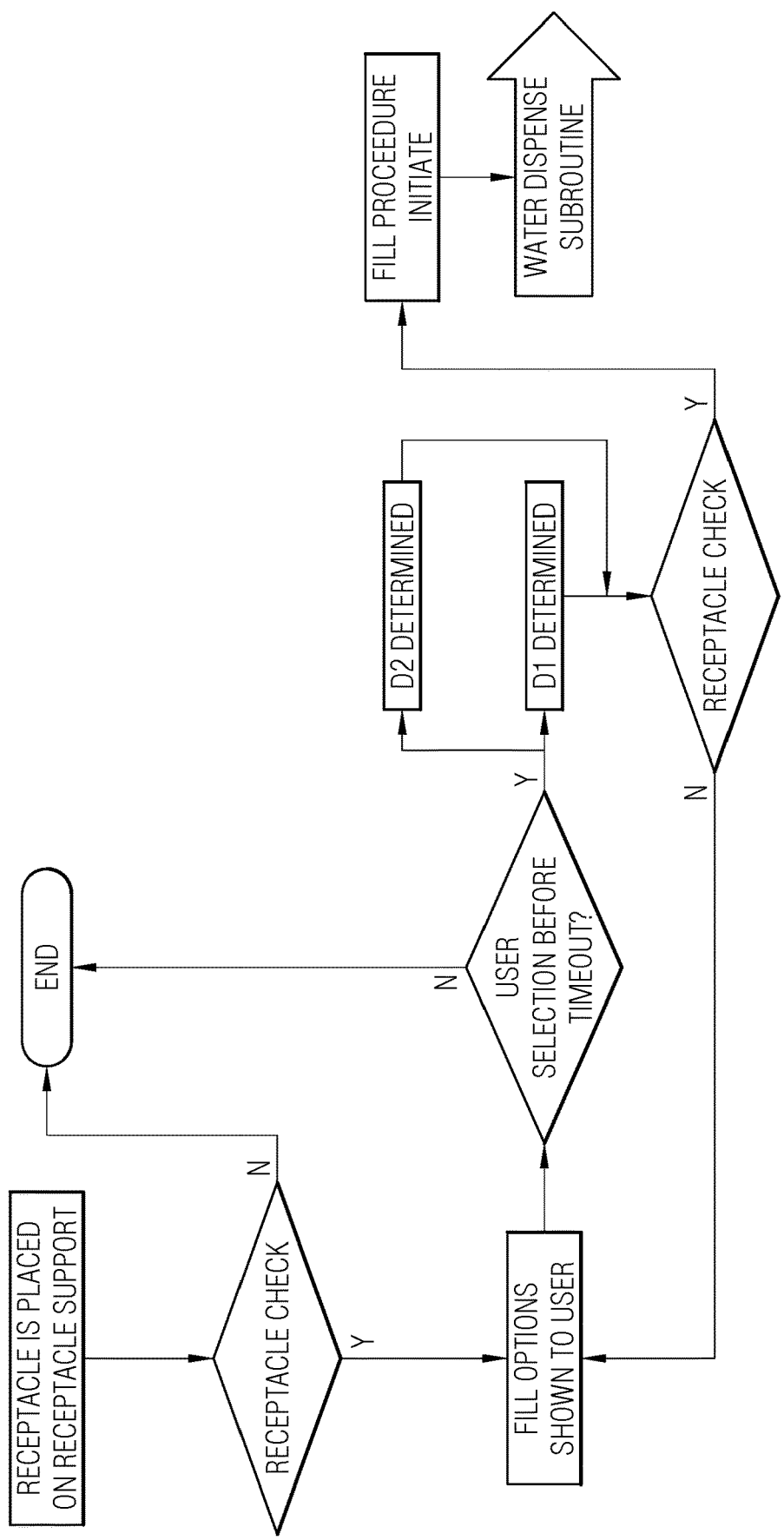
FIG. 6 is a flowchart diagram illustrating a method for initial dispensing of a liquid from a refrigerator.
Figure 7:
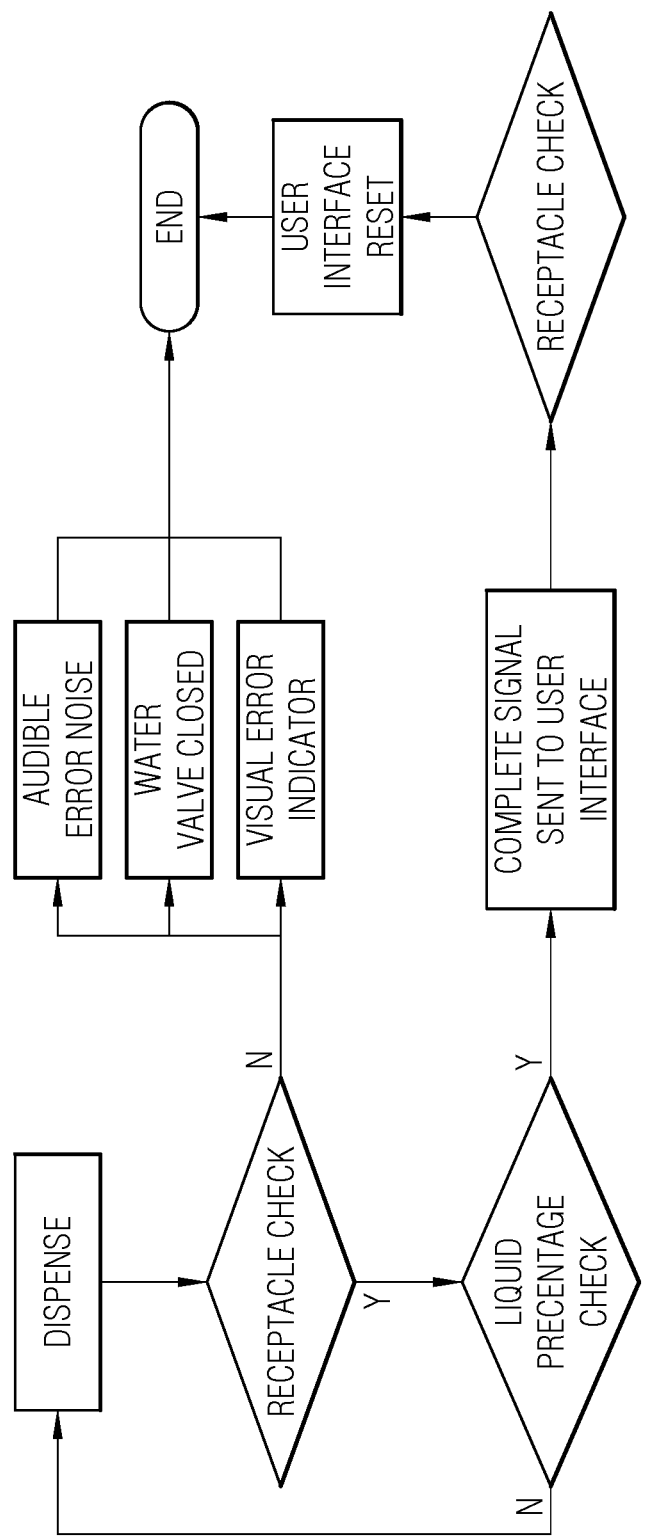
FIG. 7 is a flowchart diagram illustrating a method for the continued dispensing of a liquid from a refrigerator.

Further, referring to FIGS. 6 and 7, the user interface 40 can allow a user to select an auto-dispense function. This function allows the user to place a receptacle 36 on the receptacle support and have the dispenser system automatically fill the receptacle until full or to a desired fullness. For example, a receptacle 36 can be placed on the receptacle support 31. The control unit 34 can determine whether the receptacle 36 is positioned correctly on the receptacle support 31 using switch 33, a first sensor 51, a second sensor 52, or a combination thereof. For example, an optical switch 33 can be used to detect if a receptacle 36 is placed on the receptacle support 31, and the first sensor 51 can be used to detect if the receptacle 36 is placed under the dispensing outlet 29, i.e. a receptacle check. If the receptacle 36 is not placed correctly, the control unit can end the procedure or send a signal to the user interface to indicate an error or message via the display, speaker, LED light, etc.

After determining that the receptacle 36 is positioned correctly on the receptacle support 31, the user interface 40 can allow the user to select an auto-dispense function. The user interface 40 can be programmed to display options for a predetermined amount of time. If the user does not select an option during the predetermined amount of time, the user interface 40 can return to the previous screen or a home screen, i.e., a session time out. This session time out, can allow the user interface 40 to reset or establish when the user is not ready to select a function.

Figure 5:
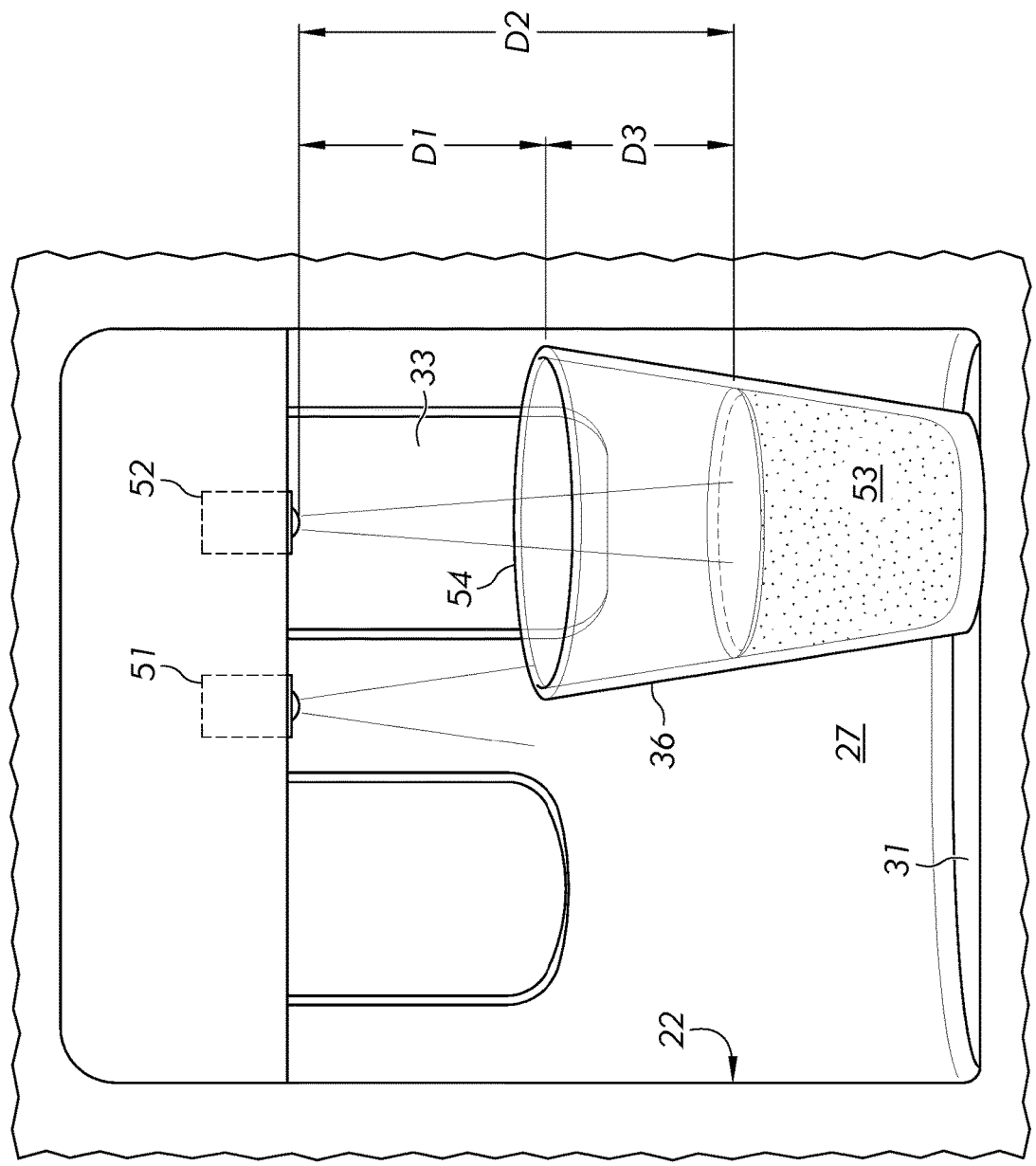
FIG. 5 is a schematic view of the example sensor system.

Referring to FIGS. 4 and 5, when the user selects the auto-dispense function on the user interface 40, the first sensor 51 will determine the receptacle's height. The first sensor 51 can detect a change in capacitance in the electrostatic field near the sensing surface. A tuned trigger circuit can interpret the capacitance to determine the distance D1 between the top of the uppermost part of the receptacle 54 and the first sensor 51. Additionally, the second sensor 52 will determine the height of any liquid 53 in the receptacle 36 by detecting a change in capacitance in the electrostatic field near the sensing surface. A tuned trigger circuit can interpret the capacitance to determine the distance D2 between the liquid meniscus 55 or liquid level and the second sensor 52. Both the distance D1 and distance D2 can be sent to the control unit 34 for further use. If no liquid exists in the receptacle 36, the second sensor 52 can determine the bottom of the receptacle 36, using the same method as described above. The control unit can determine a distance D3 between the uppermost height of the receptacle 54 and liquid meniscus 55/liquid level 53 contained within the receptacle 36 or the bottom of the receptacle when the receptacle does not contain any liquid 53. That is, distance D3 is the difference between distance D1 and distance D2. This distance D3 can be used by the control unit to calculate the current fill percentage. For example, dividing the height of the receptacle 36 from the receptacle support 31 by the distance D3, i.e., the liquid level 53, would determine the fill percentage of the receptacle 36.

Checking the height of the liquid in the receptacle 36 allows the dispenser unit to fill any partially filled receptacles, i.e., receptacles containing stale liquid. If a stale liquid is detected, the control unit 34 can send a signal to the user interface 40 to signal the user by illuminating a visual indicator, sounding a buzzer, etc. Also, checking the height of the liquid, allows any receptacle 36 that fits into the dispenser recess 21 to be filled without having the receptacle's volume known by the user.

After the control unit 34 receives the signals from the first sensor 51 and the second sensor 52, the control unit 34 will first check if the height of the liquid is greater than or equal to a predetermined percentage of the height of the receptacle. For example, if the auto fill function is set to fill 90% of the receptacle, the control unit 34 will compare the height of the water to 90% of the height of the receptacle to determine if the auto fill function should continue, i.e. a liquid percentage check. If the height of the liquid in the receptacle is greater than the 90% of the receptacle height, the control unit 34 can send a signal to the user interface 40 to alert the user that the receptacle is full.

The user interface 40 can also display the exact fill percentage. For example, the control unit 34 can process the data from the sensors to determine the percentage the receptacle is full by dividing the height of the liquid detected by the height of the receptacle. This information can be presented by the user interface on a display, a series of LEDs, or any other user-friendly interface technique.

If the height of the liquid is less than the fill percentage, the control unit can send a signal to the solenoid valve 41 to open, sending water from the source water line 42 through the water line 43 and out of at least one dispensing outlet 29, initiating the fill procedure.

Referring to FIG. 7, during the auto fill procedure, the control unit 34 can continually (or intermittently) check whether the switch 33 and/or the first sensor 51 is detecting a receptacle 36. At any time, the control unit 34 does not detect a receptacle 36, the control unit 34 can end the auto fill procedure, by sending a signal to solenoid valve to close, shutting off the flow of water from the source water line 42 to the dispensing unit 28. The control unit 34 can also send a signal to the user interface to display a visual error and/or make an audible noise indicating an error. For example, if the user decides to remove the receptacle 36 for any reason, the control unit 34 will shut off the flow of water to prevent spillage.

If the control unit 34 continues to detect a receptacle 36, the control unit 34 can continuously receive signals from the sensors which describe both the height of the receptacle 36 and the height of the liquid within the receptacle. The control unit can perform a liquid percentage check where the instantaneous liquid height of the liquid contained within the receptacle 36 can be used by the control unit 34 to compare the height of the liquid within the receptacle with the fill percentage height of the receptacle. The control unit 34 will continually compare the height of the liquid within the receptacle to the fill percentage height of the receptacle. If the liquid height is less than the fill percentage height, the receptacle 36 is determined to not be full, and the control unit 34 will not shut the solenoid valve 41. If the liquid height is greater than or equal to the fill percentage height of the receptacle 36, the control unit 34 can send a signal to the solenoid valve 41 to shut, stopping the flow of water from the source water line 42 into the liquid dispensing unit 28. The fill percentage height can be specified as a difference between the receptacle height and the liquid height. The specified difference can be predetermined or user selected.

The dispensing unit can have a predetermined height that denotes a full receptacle, for example, 90% of the receptacle height. This predetermined height default value can be adjusted by the user via the user interface 40. For example, if the user prefers a 70% full glass compared to an 90% full glass, the user can adjust this value using the options presented on the user interface 40. The control unit 34 can store this value as the default value for future uses. Further, the user interface 40 can present options of different percentages before the auto fill procedure begins, allowing the user to select the percentage full value before initiating the auto fill function. If the device is equipped with a camera or other methods for determining users (not shown here), such as biometric sensors, different users can have different default parameters.

After determining the receptacle 36 meets the desired percentage full, the control unit 34 can send a complete signal to the user interface 40. The user interface 40 can use this signal determine when to present a message to the user to signal the completion of the auto-fill procedure. This message can be a visual, audio, any other user-friendly user interface technique, or a combination of thereof. The control unit 34 can perform a receptacle check to determine when it is time to reset the user interface, thereby ending the auto-fill procedure.

In another example embodiment, the user interface can present options to the user to select a percentage of the receptacle 36 they desire filled. For instance, if the user wants a glass only 50% full, the user can select this value for the filling procedure using the user interface 40. Before the fill procedure starts, a receptacle 36 is placed on the receptacle support 31. The control unit 34 can determine whether the receptacle 36 was positioned correctly on the receptacle support 31 using switch 33, a first sensor 51, a second sensor 52, or a combination thereof. For example, an optical switch 33 can be used to detect if a receptacle 36 is placed on the receptacle support 31, and a first sensor 51 can be used to detect if the receptacle 36 is placed under the dispensing outlet 29. If the receptacle 36 is not placed correctly, the control signal can send a signal to the user interface to indicate an error or message via the display, speaker, LED light, etc.

After determining that the receptacle 36 is positioned correctly on the receptacle support 31, the user interface 40 can allow the user to select which function they want to run. For example, a 50% fill function, a 60% fill function, etc.

The user interface 40 can be programmed to display these options for a predetermined amount of time or indefinitely. If the user does not select an option during the predetermined amount of time, the user interface 40 can return to the previous screen or a home screen, i.e., a session time out. This session time out, can allow the user interface 40 to reset or establish when the user is not ready to select a function.

When the user selects the desired function on the user interface 40, the first sensor 51 will determine the receptacle's height from the uppermost part of the receptacle 54. The first sensor 51 can detect a change in capacitance in the electrostatic field near the sensing surface. A tuned trigger circuit can interpret the capacitance to determine the distance D1 between the top of the receptacle wall and the first sensor 51. Additionally, the second sensor 52 will determine the height of any liquid 53 in the receptacle 36 by detecting a change in capacitance in the electrostatic field near the sensing surface. A tuned trigger circuit can interpret the capacitance to determine the distance D2 between the liquid meniscus 55 or liquid level and the second sensor 52. Both the distance D1 and distance D2 can be sent to the control unit 34 for further use. If no liquid exists in the receptacle 36, the second sensor 52 can determine the bottom of the receptacle 36, using the same method as described above.

After the control unit 34 receives the signals from the first sensor 51 and the second sensor 52, the control unit 34 will first check if the height of the liquid is greater than or equal to a selected fill percentage of the height of the receptacle. For example, if a 50% fill function is selected, the control unit 34 will compare the height of the water to 50% of the height of the receptacle to determine if the fill function should continue. If the height of the liquid is less than the fill percentage, the control unit send a signal to the solenoid valve 41 to open, sending water from the source water line 42 through the water line 43 and out of at least one dispensing outlet 29, initiating the fill procedure. If the height of the liquid in the receptacle is greater than the selected fill percentage, the control unit 34 can send a signal to the user interface 40 to alert the user that the receptacle is filled above the desired height.

The user interface 40 can also display the exact fill percentage. For example, the control unit 34 can process the data from the sensors to determine the percentage the receptacle is full by dividing the height of the liquid detected by the height of the receptacle. This information can be presented by the user interface on a display, a series of LEDs, or any other user-friendly interface technique.

During the fill procedure, the control unit 34 can continually check whether the switch 33 and/or the first sensor 51 is detecting a receptacle 36. At any time, the control unit 34 does not detect a receptacle 36, the control unit 34 can end the fill procedure, by sending a signal to solenoid valve to close, shutting off the flow of water from the source water line 42 to the dispensing unit 28. For example, if the user decides to remove the receptacle 36 for any reason, the control unit 34 will shut off the flow of water to prevent spillage.

If the control unit 34 continues to detect a receptacle 36, the control unit 34 can continuously receive signals from the sensors which describe both the height of the receptacle 36 and the height of the liquid within the receptacle. The instantaneous liquid height of the liquid contained within the receptacle 36 can be used by the control unit 34 to compare the height of the liquid within the receptacle with the fill percentage height of the receptacle. The control unit 34 will continually compare the height of the liquid within the receptacle to the fill percentage height of the receptacle. If the liquid height is less than the fill percentage height, the receptacle 36 is determined to not be full, and the control unit 34 will not shut the solenoid valve 41. If the liquid height is greater than or equal to the fill percentage height of the receptacle 36, the control unit 34 can send a signal to the solenoid valve 41 to shut, stopping the flow of water from the source water line 42 into the liquid dispensing unit 28.

When the procedure has been terminated the control unit 34 can send a signal to the user interface 40 to display a light to indicate the filling procedure is done for the user. Alternatively, the user interface 40 can produce a sound such as a beep to indicate that the filling of the receptacle is finished.

The control unit 34 can also use the user interface 40 to signal when the receptacle is full or has been filled to a predetermined level. The control unit 34 can send signals to the user interface 40, in which activate various methods of signaling, such as an audible tone using a sound producing device, a blinking light-emitting diode (LED), a graphic displayed on the user interface 40, etc. Further, during the filling procedure, the control unit 34 can continuously send data to the user interface 40, including the live or instantaneous level of the liquid in the receptacle, the height of the receptacle, the percentage of the receptacle filled, or any other information used by the control unit. This information can be displayed or presented by the user interface 40 to give the user a live update to the fill procedure they have selected.

Further, the user interface 40 can present other methods of dispensing water, such as a manually method that can require the user to actively press a button or other input device to dispense water into the receptacle.

An additional method of operation can include using the switch 33 to detect when a receptacle 36 is placed on the receptacle support 31 and auto initiating the auto fill procedure. The switch 33 can send a signal to the control unit 34, signaling when a receptacle is placed positioned under the dispensing unit 28. Additionally, a first sensor 51 can also be used in conjunction with the switch 33 or alone to detect the placement of the receptacle 36. After the control unit 34 receives a signal identifying a receptacle 36 is positioned correctly, the control unit 34 can start the auto fill procedure, percentage fill procedure, or any other fill method. This method does not require the user to select or confirm the auto fill method selection using the user interface 40. This method of operation can be set as a default method using the user interface 40, allowing users to fill receptacles very quickly without much user engagement with the user interface 40.

The disclosure has been described with reference to the example embodiments described above. Modifications and alterations will occur to others upon a reading and understanding of this specification. Examples embodiments incorporating one or more aspects of the disclosure are intended to include all such modifications and alterations insofar as they come within the scope of the appended claims.

What is claimed is:

1. A refrigerator, comprising:
a cabinet defining a food-storage compartment;
a door pivotally mounted to the cabinet to provide selective access to the food-storage compartment;
a liquid dispensing unit accessible at an exterior surface of the door comprising:
a receptacle support;
a dispensing system comprising an electrically-operated valve, the dispensing system being configured to dispense a liquid into a receptacle on the receptacle support;
a sensor system comprising:

a first capacitive sensor; and
a second capacitive sensor;
a control unit electrically coupled to the dispensing system and electrically coupled to the sensor system,
wherein the control unit is configured to operate the first capacitive sensor to determine a receptacle height relative to a reference, and is configured to operate the second capacitive sensor to determine an instantaneous liquid height, relative to the reference, of a liquid contained within the receptacle, and is configured to operate the electrically-operated valve based on the receptacle height and the instantaneous liquid height, and
wherein at least one of the capacitive sensors is configured to produce an electrostatic field and detect one or more changes thereto based on entry into the electrostatic field by the receptacle.

2. The refrigerator of claim 1, wherein:
the control unit is configured to operate the electrically-operated valve such that liquid is dispensed into the receptacle until the instantaneous liquid height is a specified difference from the receptacle height.

3. The refrigerator of claim 2, further comprising a user interface,
wherein the user interface is configured to allow a user to select the specified difference as a desired liquid height as a percentage of the receptacle height.

4. The refrigerator of claim 1, wherein:
the reference is a location of the receptacle support.

5. The refrigerator of claim 1, wherein:
the reference is a location of the first sensor or the second sensor.

6. The refrigerator of claim 1, wherein:
the control unit is configured to operate the first capacitive sensor to determine an uppermost part of the receptacle as the receptacle height.

7. The refrigerator of claim 1, wherein:
the control unit is configured to operate the sensor system to determine a stale liquid contained in the receptacle.

8. The refrigerator of claim 1, further comprising a user interface electrically coupled to the control unit,
wherein the user interface is configured to present the instantaneous liquid height relative to the receptacle height of a liquid contained within the receptacle.

9. The refrigerator of claim 1, further comprising a user interface comprising
at least one sound producing device,
wherein the sound producing device is configured to alert a user when the receptacle is full.

10. A method of dispensing a liquid from a refrigerator, comprising the steps of:
sensing, by a first capacitive sensor, an uppermost receptacle height of a top of a receptacle relative to a reference;
dispensing a liquid into the receptacle;
sensing, by a second capacitive sensor, an instantaneous liquid height of a liquid contained within the receptacle relative to the reference;
comparing the instantaneous height of the liquid within the receptacle with a height of the receptacle to determine if the liquid height is a specified difference from the receptacle height;
repeating the steps of sensing the instantaneous height of the liquid within the receptacle and comparing the instantaneous height of the liquid within the receptacle with the height of the receptacle; and
terminating the dispensing when the liquid height is a specified difference from the height of the receptacle,
wherein at least one of the capacitive sensors is configured to produce an electrostatic field and detect one or more changes thereto based on entry into the electrostatic field by the receptacle.

11. The method of claim 10, wherein the reference is a location of a first sensor or second sensor.

12. The method of claim 10, further comprising the steps of:
illuminating at least one visual indicator to indicate a stale liquid found in the receptacle.

13. The method of claim 10, further comprising the steps of:
producing an audible tone when terminating the dispensing of liquid.

14. The method of claim 10, further comprising the steps of:
displaying the instantaneous height of the liquid within the receptacle relative to the height of the receptacle.

15. The method of claim 10, wherein the reference is a location of a receptacle support on which the receptacle is located during the dispensing.

16. The method of claim 10, further comprising the steps of:
determining the specified difference based on a selected fill percentage.

17. A refrigerator, comprising:
a cabinet defining a food-storage compartment;
a door pivotally mounted to the cabinet to provide selective access to the food-storage compartment;
a liquid dispensing unit accessible at an exterior surface of the door comprising:
a receptacle support;
a dispensing system comprising an electrically-operated valve, the dispensing system being configured to dispense a liquid into a receptacle on the receptacle support;
a sensor system comprising:
a first capacitive sensor, the first capacitive sensor is disposed offset from a center of the receptacle support; and
a second capacitive sensor;
a control unit electrically coupled to the dispensing system and electrically coupled to the sensor system,
wherein the control unit is configured to operate the first capacitive sensor to determine a receptacle height relative to a reference, and is configured to operate the second capacitive sensor to determine an instantaneous liquid height, relative to the reference, of a liquid contained within the receptacle, and is configured to operate the electrically-operated valve based on the receptacle height and the instantaneous liquid height.

* * * * *